Patented Mar. 20, 1923.

1,449,281

UNITED STATES PATENT OFFICE.

JULIA ETTA GROVER, OF LAKEWOOD, NEW JERSEY.

COMPOSITION OF MATTER FOR CLEANING CRYSTAL AND GLASSWARE.

No Drawing. Application filed March 18, 1921. Serial No. 453,451.

*To all whom it may concern:*

Be it known that I, JULIA E. GROVER, a citizen of the United States, and a resident of Lakewood, in the county of Ocean and State of New Jersey, have invented a new and Improved Composition of Matter for Cleaning Crystal and Glassware, of which the following is a full, clear, and exact description.

This invention relates to a composition of matter and has for an object the provision of a composition which is economical to make and to use, which is simple of preparation, and is highly efficient in its cleansing and polishing function, especially when used on crystal, glassware, chinaware, enamelware and crockery.

The composition as hereinafter described is the preferred form of my composition, although the elements therein used may be slightly varied in proportion and in general character without departing from the spirit of the invention.

The preferred form of my invention comprises a composition made up as follows:

| | |
|---|---|
| Sal soda | 2 pounds. |
| Chlorinated lime | ¼ pound. |
| Sulphur | 1 ounce. |
| Alum | ½ ounce. |
| Borax | 1 ounce. |
| Glycerine | 1 ounce. |
| Oil of citronella | ¼ ounce. |
| Inert matter (water) | ½ gallon. |

The ingredients are mixed together simultaneously in the water and boiled all together for one-half hour, after which the solution is permitted to stand for twelve hours and then filtered. The clear liquor may be bottled or stored as desired.

In cleaning windowpanes and substances of similar nature, one teaspoonful of the composition in one pint of water is used. This is applied to a moist cloth and the surface to be cleaned is rubbed therewith and polished immediately thereafter with a dry cleaning cloth. In cleaning glassware and sticky surfaces, the composition is to be used in the same manner but without dilution.

The sal soda and the borax function in the composition as cleansing agents or detergents; the chlorinated lime acts and functions as a bleach and disinfectant; the sulphur acts to slightly color the solution and as a germicide; the oil of citronella, as a deodorant; the alum acts as a drying agent; and the glycerine acts as a softening and polishing agent.

The essential principle of my invention may still be maintained by using these elements in the entirety above set forth or by using various combinations of them, without necessarily using all of them.

What I claim is:

1. A composition of matter for cleaning glass and chinaware, formed by mixing and boiling substantially sal soda, borax, sulphur, oil of citronella, alum, chlorinated lime, glycerine, and water.

2. A composition of matter for cleaning glass and chinaware, formed by mixing and boiling substantially two pounds of sal soda, one ounce of borax, one ounce of sulphur, one-quarter ounce of oil of citronella, one-half ounce of alum, one-quarter pound of chlorinated lime, one ounce of glycerine, and one-half gallon of water.

JULIA ETTA GROVER.